(12) United States Patent
Baum et al.

(10) Patent No.: US 8,041,073 B2
(45) Date of Patent: Oct. 18, 2011

(54) DECODING WATERMARK INFORMATION ITEMS OF A WATERMARKED AUDIO OR VIDEO SIGNAL USING CORRELATION

(75) Inventors: Peter Georg Baum, Hannover (DE); Walter Voessing, Hannover (DE)

(73) Assignee: Thomson Licensing, Boulogne-Billancourt (FR)

( * ) Notice: Subject to any disclaimer, the term of this patent is extended or adjusted under 35 U.S.C. 154(b) by 793 days.

(21) Appl. No.: 12/086,575

(22) PCT Filed: Dec. 1, 2006

(86) PCT No.: PCT/EP2006/069214
§ 371 (c)(1),
(2), (4) Date: Jun. 16, 2008

(87) PCT Pub. No.: WO2007/068609
PCT Pub. Date: Jun. 21, 2007

(65) Prior Publication Data
US 2009/0268937 A1    Oct. 29, 2009

(30) Foreign Application Priority Data
Dec. 16, 2005    (EP) .................................... 05090340

(51) Int. Cl.
*G06K 9/00* (2006.01)
*H04L 9/32* (2006.01)

(52) U.S. Cl. .......................... 382/100; 382/280; 713/176

(58) Field of Classification Search ................... 382/100, 382/115, 145, 155, 168, 172, 175, 181, 191–197, 382/232, 233, 234, 235–254, 274, 275, 276, 382/278, 280–291, 305, 312; 704/273; 713/176
See application file for complete search history.

(56) References Cited
U.S. PATENT DOCUMENTS
7,486,799 B2 *  2/2009  Rhoads .......................... 382/100
(Continued)

OTHER PUBLICATIONS

N.J. Mathai et al: "VLSI implementation of a real-time video watermark embedder and detector", Proceedings of the 2003 IEEE Inter'l Symposium on Circuits and Systems, vol. 2, 2003, pp. II.772-II.775.
R. Myer et al: "Convolution algorithms on DSP processors", Speech Processing 2, VLSI, Underwater Signal Processing, vol. 2, Conf. 16, Apr. 14, 1991, pp. 2193-2196.

(Continued)

*Primary Examiner* — Seyed Azarian
(74) *Attorney, Agent, or Firm* — Robert D. Shedd; Jeffrey M. Navon (57) ABSTRACT

Watermark information consists of several data symbols which are embedded continuously in an audio or a video signal using modulation with a pseudo-random sequence if spread spectrum technology is used. At decoder site the watermark information is regained using correlation of the received signal with a candidate pseudo-random sequence. Such correlation can be performed by one-dimensional real-symmetric fast Fourier transform of the two input signal vectors, which each consist of a section of N values of the input signal, to which section N−1 zeroes are attached, by multiplying one of the transformed vectors by the conjugated version of the other transformed vector, followed by inverse RFFT transform of that frequency domain product vector. However, if the level of a spread-spectrum watermark is too low or if too much noise had been added during the transmission of the audio or video signals, the correlation does not show a clear peak, which means that the watermark information bits cannot be recovered. According to the invention, the correlation result is improved by setting to zero in the frequency domain frequency bins of the vector which do not have a positive impact on the correlation peak at location zero, i.e. which frequency bins do not contribute to that peak. Thereby the noise level in the correlation or matched filter output is reduced and the watermark information items can be recovered or decoded correctly from the received watermarked audio or video signal.

14 Claims, 5 Drawing Sheets

U.S. PATENT DOCUMENTS

| | | | |
|---|---|---|---|
| 7,543,148 B1 * | 6/2009 | Kirovski et al. | 713/176 |
| 7,565,296 B2 * | 7/2009 | Oh | 704/273 |
| 7,730,317 B2 * | 6/2010 | Moskowitz et al. | 713/176 |
| 7,751,596 B2 * | 7/2010 | Rhoads | 382/115 |
| 7,792,322 B2 * | 9/2010 | Tapson | 382/100 |
| 7,953,270 B2 * | 5/2011 | Rhoads | 382/145 |

OTHER PUBLICATIONS

B. Lutkenhoner et al: "Software manipulations to speed up a real-valued fast Fourier transform algorithm" Computer Methods and Programs in Biomedicine Netherlands, vol. 29, No. 2, Jun. 1989, pp. 129-142.

* cited by examiner

DECODING WATERMARK INFORMATION ITEMS OF A WATERMARKED AUDIO OR VIDEO SIGNAL USING CORRELATION

This application claims the benefit, under 35 U.S.C. §365 of International Application PCT/EP2006/069214, filed Dec. 1, 2006, which was published in accordance with PCT Article 21(2) on Jun. 21, 2007 in English and which claims the benefit of European patent application No. 05090340.0, filed Dec. 16, 2005.

The invention relates to a method and to an apparatus for decoding watermark information items of a watermarked audio or video signal using correlation and, more general, to a method of pre-processing the input signals used for a correlation or a matched filter in order to reduce the influence of noise in the input signals on the correlation or matched filter result.

BACKGROUND

Watermark information (denoted WM) consists of several data symbols which are embedded continuously in carrier content, for instance in (encoded) audio or video signals. The watermarking serves e.g. for identifying the author of the signals. At decoder site the WM is regained by using correlation of the received signal with a known bit sequence, e.g. an m-sequence if spread-spectrum is used as underlying technology.

Most WM technologies transmit redundancy bits for error correction. But such error correction has a limited capacity only. An error correction can correct some symbols, if one or more data symbols cannot be directly recovered at receiver side. But if the capacity of the error correction is exceeded, the WM can not be recovered.

A correlation can be performed by RFFT transforming (one-dimensional real-symmetric fast Fourier transform) two input signal vectors, which each consist of a section of N values of the input signal, to which section N−1 zeroes are attached (i.e. padding by N−1 zeroes), and by multiplying one of the transformed vectors by the conjugated version of the other transformed vector, followed by inverse RFFT transform of that frequency domain product vector.

Invention

Spread-spectrum watermarked signals are decoded using a correlation or a matched filter. If (in spite of error correction) the level of a spread-spectrum watermark is too low or if too much noise had been added during the transmission of the audio or video signals, the correlation does not show a clear peak, which means that the WM information bits cannot be recovered.

A problem to be solved by the invention is to improve the unambiguousness of the correlation result. This problem is solved by the method disclosed in claim 1. An apparatus that utilises this method is disclosed in claim 2.

The invention solves this problem by adaptively pre-filtering the correlation result or vector in the frequency domain before inverse RFFT transforming it. The correlation result is improved by removing in the frequency domain a number of frequency bins of that vector which frequency bins do not have a positive impact on the correlation peak at location zero, i.e. which frequency bins do not contribute to that peak. Thereby the noise level in the correlation or matched filter output is reduced and the watermark information items can be recovered or decoded correctly from the received watermarked audio or video signal. The inventive pre-filtering is carried out following synchronisation of the decoder, i.e. the filtering has no influence on the decoder or receiver synchronisation.

The invention improves the reliability of the watermark signal decoding or recovering and makes watermarking of critical sound or video signals much more robust, which may make the difference between regaining WM information and regaining no WM information at all.

The invention can be used in all watermarking applications in which a correlation or matched filter function are used and in which the watermark signal detector and the received audio/video signal are already synchronised.

In principle, the inventive method is suited for decoding watermark data information from a watermarked audio or video signal on which said watermark data information was modulated, using correlation with a pre-determined data sequence, said method including the steps:

receiving a section of said watermarked audio or video signal;
correlating said section with at least one pseudo-random sequence;
deriving from the correlation result or results, respectively, said watermark data information, wherein said correlations are carried out in the frequency domain wherein bins of the resulting spectrum or spectra for said section are set to zero which do not have an impact on forming a peak at location zero in said correlation result or results, followed by inversely transforming the such processed spectrum or spectra into the time domain.

In principle the inventive apparatus is suited for decoding watermark data information from a watermarked audio or video signal on which said watermark data information was modulated, using correlation with a pre-determined data sequence, said apparatus including:

means being adapted for receiving a section of said watermarked audio or video signal;
means being adapted for correlating said section with at least one pseudo-random sequence and for deriving from the correlation result or results, respectively, said watermark data information, wherein said correlations in said correlation means are carried out in the frequency domain wherein bins of the resulting spectrum or spectra for said section are set to zero which do not have an impact on forming a peak at location zero in said correlation result or results, and wherein said correlation means inversely transform the such processed spectrum or spectra into the time domain.

Said correlation can be performed using a one-dimensional real-symmetric fast Fourier transform in which, to said section representing a first transformed vector and having N values and to said pseudo-random sequence representing a second transformed vector having N values, N−1 zeroes are attached, and wherein one of said transformed vectors is multiplied by the conjugated version of the other transformed vector in order to form said correlation in the frequency domain, and wherein said inverse transform is an inverse one-dimensional real-symmetric fast Fourier transform.

Advantageous additional embodiments of the invention are disclosed in the respective dependent claims.

DRAWINGS

Exemplary embodiments of the invention are described with reference to the accompanying drawings, which show in.

EXEMPLARY EMBODIMENTS

Correlation or matched filtering can be used for recovering spread-spectrum WM information items. More general, correlation or matched filtering can be used for recovering modulated bit values.

Figure 1:
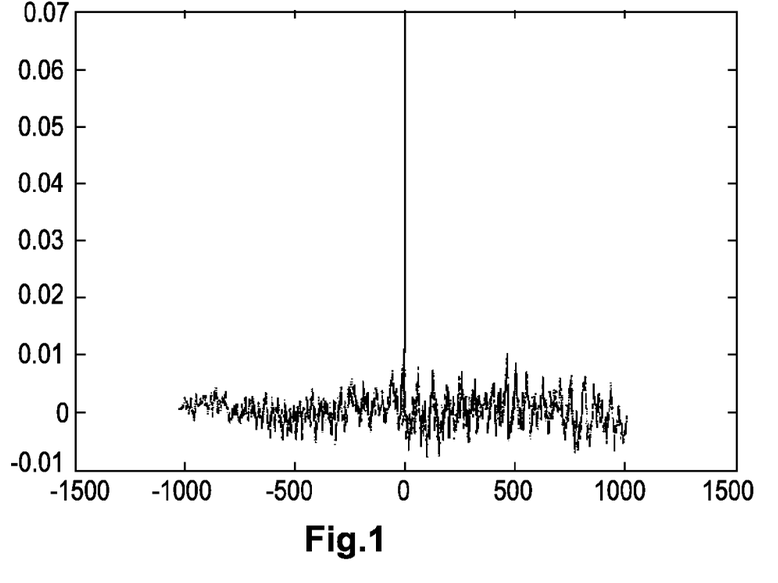
FIG. 1 correlation result for a binary phase shift keying (BPSK) modulated signal with the pseudo-random sequence, showing a clearly recovered 'zero' value.
Figure 2:
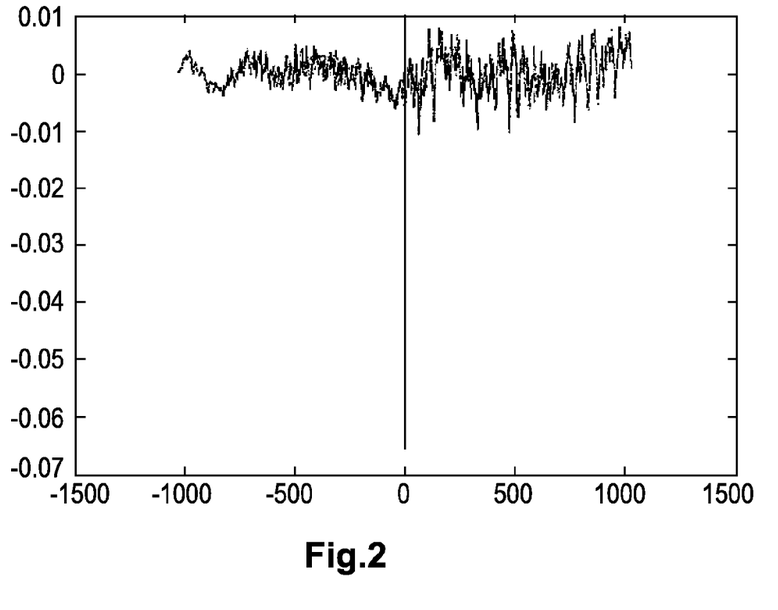
FIG. 2 a corresponding clearly recovered 'one' value.

If a binary phase shift keying (BPSK) modulation is used, the incoming signal is correlated with a known pseudo-random sequence. If the peak of the correlation is positive as shown in FIG. 1, for example a value 'zero' is decoded, and if it is negative as shown in FIG. 2, a value 'one' is decoded.

If a code shift keying modulation (CSK) is used, the incoming signal is correlated with at least two known pseudo-random sequences. If the correlation with the first one shows a clear peak, a value 'zero' is decoded, and if the correlation with the second one shows a clear peak, a value 'one' is decoded.

Figure 3:
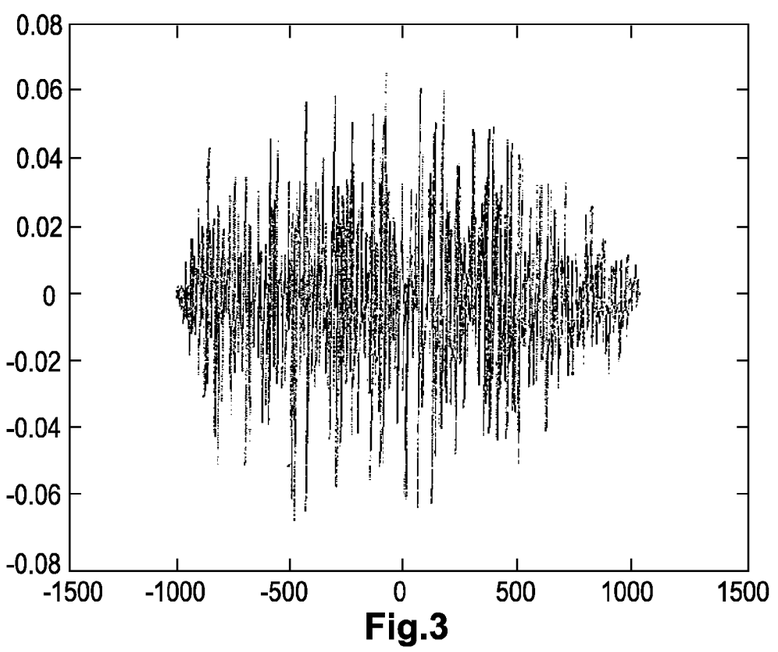
FIG. 3 correlation result for a BPSK modulated signal that was received with a low SNR.
Figure 5:
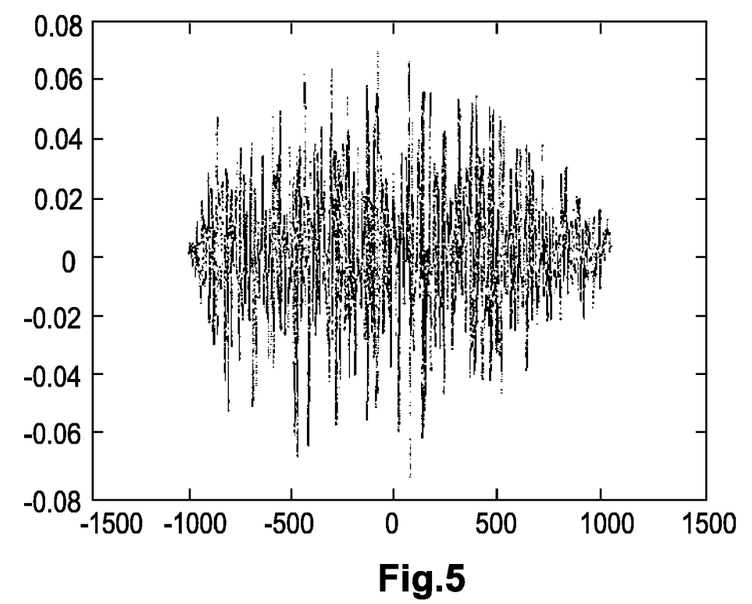
FIG. 5 correlation result for a code shift keying (CSK) modulated low-SNR signal with a first pseudo-random sequence.
Figure 6:
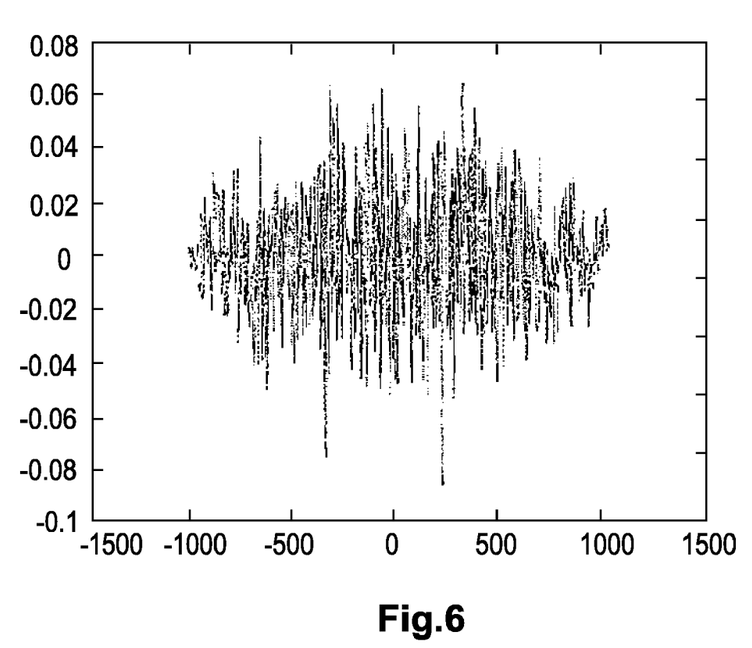
FIG. 6 correlation result for a CSK modulated low-SNR signal with a second pseudo-random sequence.

It can happen in both cases, that the correlation does not provide any clear peak as depicted in FIG. 3 and FIG. 5/6. This may be due to additional noise which has been added between encoding and decoding, or in watermarking applications if for example the watermark signal level is too low. As is known, the calculation of the correlation can be carried out either in time domain or in frequency domain.

Advantageously, in the frequency domain it can be decided according to the invention for each frequency bin whether or not that bin will lead to a 'good' correlation which provides a clear result.

The incoming signal can be filtered in the following way (in Matlab notation), whereby:

```
fSig = rfft(N values of the incoming signal, padded by N-1 zeroes)
fSeq = rfft(N values of the sequence to test, padded by N-1 zeroes)
spectrum = fSig * conj(fSeq)              correlation in freq. domain
ind = calcIndicator(spectrum)
if sum(ind) < length/2                    if average of ind is <.5
    ind = 1-ind                           ind is thus in the range 0...+1
end
for k=0 to length
begin
    if ind(k) < LIMIT                     if the magnitude of ind<LIMIT
        spec(k) = 0                       if indicator is smaller than threshold, set corresponding bin value to zero
    end
end
return irfft(spec)                        improved correlation result is output
with
calcIndicator(spectrum)
    ind = cos(angle(spectrum))
    return (ind+1)/2
wherein angle( ) returns the angle of complex values in the range -π to +π.
```

'rfft' means a one-dimensional real-symmetric fast Fourier transform;
'irfft' means an inverse one-dimensional real-symmetric fast Fourier transform;
'N' is an integer value;
'ind' is an indicator for each spectral bin whether or not that bin contributes to the correlation peak;
length = N/2+1.

The test for sum(ind) needs to be carried out only for modulations (e.g. BPSK) where the correlation peak should be either '+1' or '−1'. Because indicator 'ind' normally is in the range 0 . . . +1, the range is thereby shifted to −1 . . . +1.

LIMIT is chosen suitably. A good value for LIMIT is such that the smallest 15% values of indicator 'ind' will fall below this limit or threshold.

In embedded environments where the cosine function is too computational intensive, another definition for calcIndicator may be:
calcIndicator(spectrum)
    return ind=1-abs(angle(spectrum))/π;
wherein angle( ) returns the angle of complex values in the range -π to +π.

Figure 4:
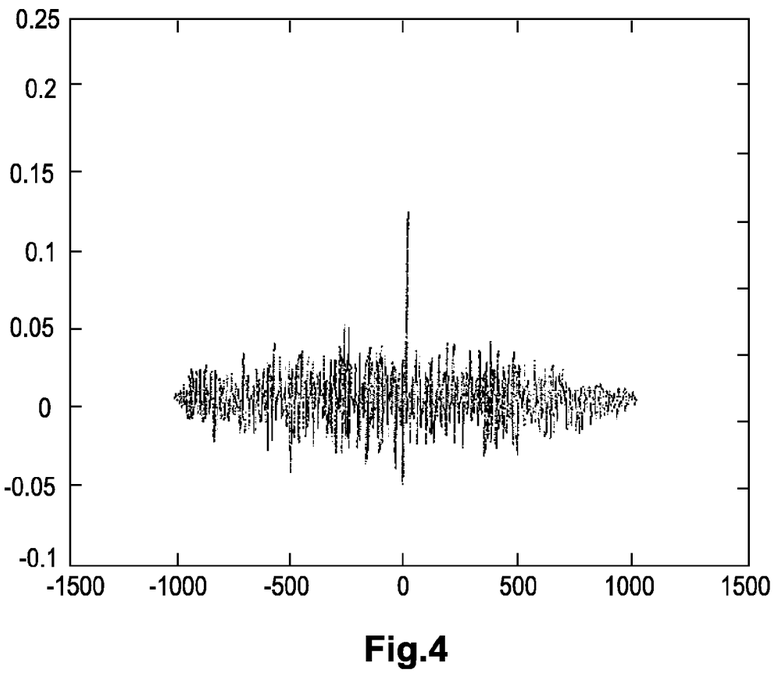
FIG. 4 the correlation result of FIG. 3 where the inventive adaptive pre-filtering has been used.

FIG. 4 shows the correspondingly filtered correlation result of the version shown in FIG. 3 where the inventive adaptive pre-filtering has been used. There is a clear improvement: the positive peak can easily be detected, and the BPSK modulated bit can be decoded.

FIGS. 5 and 6 show the correlation result for a code shift keying (CSK) modulated low-SNR signal with the first and the second modulation sequence, respectively. Although in fact the first modulation sequence is embedded, no decoding is possible.

Figure 7:
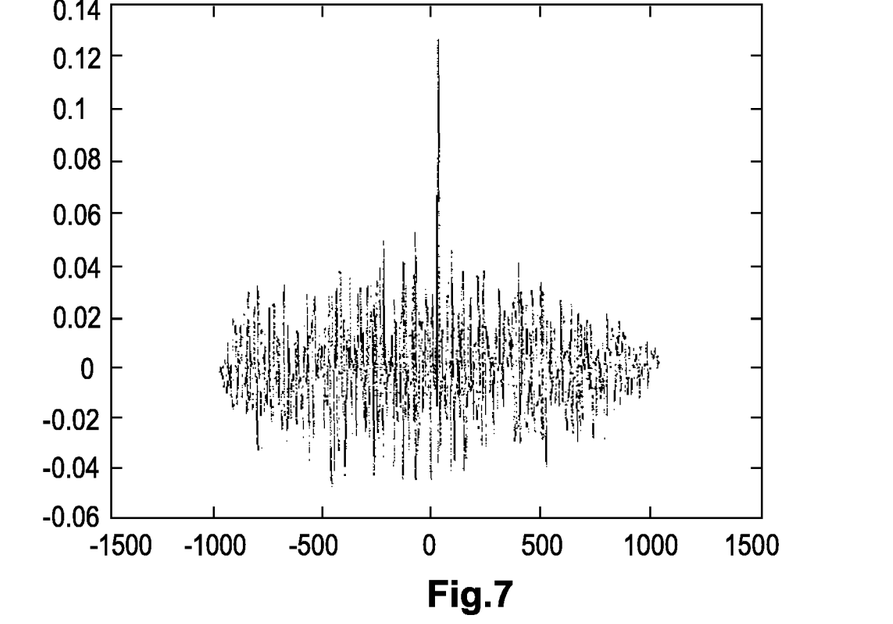
FIG. 7 correlation result for a CSK modulated low-SNR signal with the first pseudo-random sequence where the inventive adaptive pre-filtering has been used.
Figure 8:
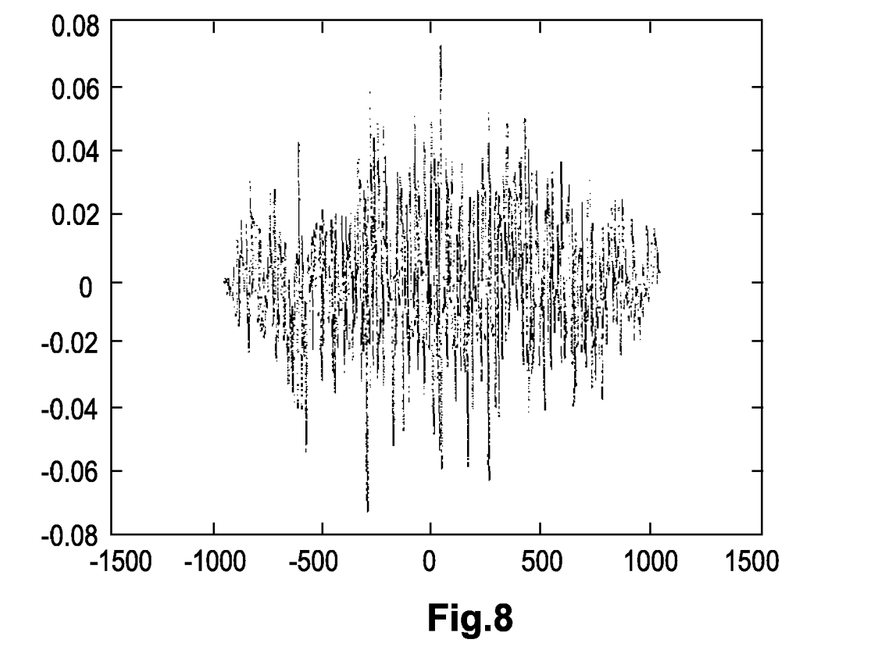
FIG. 8 correlation result for a CSK modulated low-SNR signal with the second pseudo-random sequence where the inventive adaptive pre-filtering has been used.

FIGS. 7 and 8 show the corresponding pre-filtered versions of the correlation. The comparison reveals a clear match of the first modulation sequence.

In a test, 2800 pseudo-random sequences were embedded with CSK modulation in a spread-spectrum audio watermarking at a very low embedding level. Using the known correlation processing, 350 of these sequences were detected wrongly. When the inventive pre-filtered correlation processing was used, only 12 sequences were detected wrongly.

Figure 9:
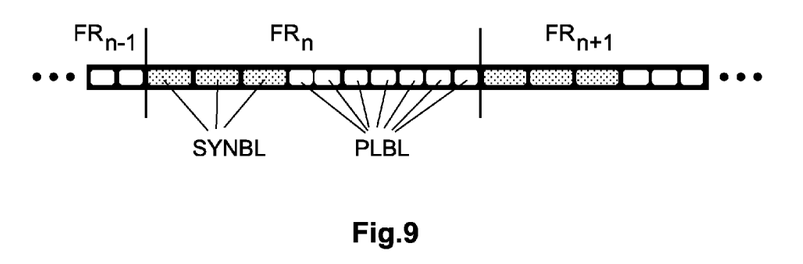
FIG. 9 successive WM frames with synchronisation blocks.

The smallest self-containing unit of a watermark is called a frame. FIG. 9 shows three successive frames $FR_{n-1}$, $FR_n$ and $FR_{n+1}$. A frame consists of a number of synchronisation blocks SYNBL (at least one synchronisation block) which are needed to detect the start of the frame at decoder side, and a number of payload blocks PLBL (at least one valid payload block or symbol) which carry the actual information. Frames are inserted synchronously or asynchronously in the audio stream, dependent on the technology. The insertion of the payload blocks is done consecutively, i.e. synchronised after the SYNBL blocks. Each payload block holds one or more bits of information. A payload block is therefore also called a symbol. The payload symbols include the information to be inserted into the WM, and optionally contain redundancy information used for error correction. A typical setting is for example 5 synchronisation blocks and 36 payload blocks per frame, each payload block carrying 2 bits, whereby 24 of these 72 bits are used for error correction resulting in a net payload of 48 bits per frame.

Figure 10:
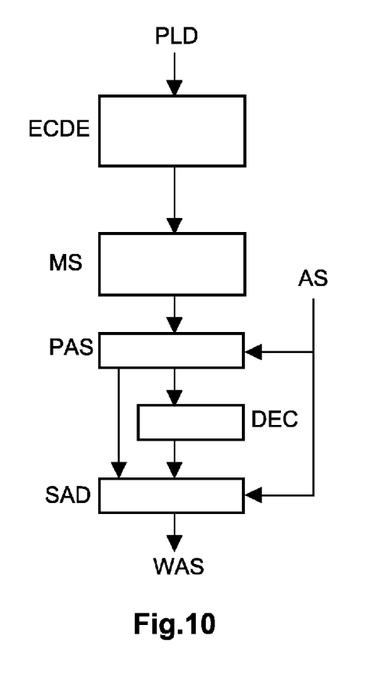
FIG. 10 known watermark encoder.

In the known watermarking encoder in FIG. 10 payload data PLD to be used for watermarking an audio signal AS is input to an error correction and/or detection encoding stage ECDE which may add redundancy bits facilitating in the decoder a recovery from erroneously detected symbols. In a downstream modulation and spectrum spreading stage MS a spread-spectrum processing takes place. The output signal of stage MS can be fed to a psycho-acoustical shaping stage PAS which shapes its input signal such that the WM is not audible, and which feeds its output signal to a signal adder and decision stage SAD and to a corresponding known payload decoder stage DEC. This shaping is carried out block-wise according to psycho-acoustic principles, i.e. the ratio between watermark and audio energy may change from symbol to symbol.

Stages PAS and SAD each receive the audio stream signal AS to be watermarked and process the WM frames symbol by symbol. Stage SAD determines whether the payload data PLD have been decoded correctly in decoder DEC for a current WM frame $FR_n$. If true, the psycho-acoustical shaped WM symbol is added to the current frame. If not true, the current symbol in the current frame $FR_n$ may be skipped. Thereafter the processing continues for the next symbol following the current symbol. After the processing for a WM frame is completed a correspondingly watermarked frame WAS embedded in the audio signal is output. Thereafter the processing continues for the frame $FR_{n+1}$ following the current frame.

Figure 11:
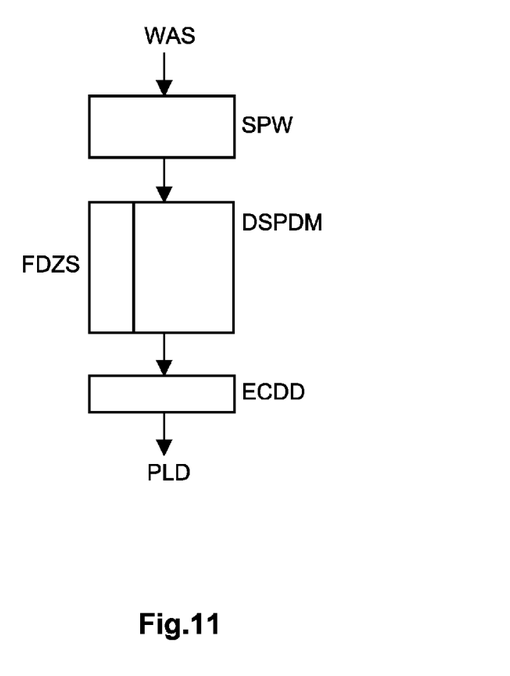
FIG. 11 inventive watermark decoder.

In the inventive watermarking decoder in FIG. 11 a watermarked frame WAS of the audio signal may pass through a spectral whitening stage SPW (which reverses the shaping that was carried out in stage PAS) and enters a de-spreading and demodulation stage DSPDM that retrieves the embedded data from the signal WAS by using the above-described inventive processing, in which in a frequency domain zero setting stage in the frequency domain it is decided for the frequency bins whether or not a bin is set to zero for the correlation.

If at encoder side an error correction and/or detection encoding was carried out, the WM symbols pass to an error correction and/or detection decoding stage ECDD.

Thereafter the valid payload data PLD are output.

The invention claimed is:

1. A method for decoding watermark data information from a watermarked audio or video signal on which said watermark data information was modulated, using correlation with a pre-determined data sequence, said method performed by a processor, comprising the steps:
receiving a section of said watermarked audio or video signal;
correlating said section with at least one pseudo-random sequence;
deriving from the correlation result or results, respectively, said watermark data information,
wherein said correlations are carried out in the frequency domain and wherein bins of the resulting spectrum or spectra for said section are set to zero which do not have an impact on forming a peak at location zero in said correlation result or results, followed by inversely transforming the such processed spectrum or spectra into the time domain, wherein said correlation is performed using a one-dimensional real-symmetric fast Fourier transform in which, to said section representing a first transformed vector and having N values and to said pseudo-random sequence representing a second transformed vector having N values, N−1 zeroes are attached, and wherein one of said transformed vectors is multiplied by the conjugated version of the other transformed vector in order to form said correlation in the frequency domain, and wherein said inverse transform is an inverse one-dimensional real-symmetric fast Fourier transform.

2. The method according to claim 1, in order to determine which ones of said bins do not have an impact on forming a peak at location zero in said correlation result, an indicator value for each bin is calculated and the values of said indicators are compared with a threshold value and the bin values being smaller than said threshold value are set to zero.

3. The method according to claim 2, wherein said threshold value is selected such that essentially the smallest 15% of said bin values are set to zero.

4. The method according to claim 1, wherein said section is processed with two different ones of said pseudo-random sequences in case said modulation is such that said correlation can result in a positive and a negative peak.

5. The method according to claim 4, wherein said modulation is a CSK modulation.

6. The method according to claim 1, wherein said modulation is a BPSK modulation.

7. The method according to claim 1, wherein the value range for said resulting spectra is shifted from −1 . . . +1 to 0 . . . +1 or to 0 . . . −1.

8. An apparatus for decoding watermark data information from a watermarked audio or video signal on which said watermark data information was modulated, using correlation with a pre-determined data sequence, said apparatus comprising:
means being adapted for receiving a section of said watermarked audio or video signal;
means being adapted for correlating said section with at least one pseudo-random sequence and for deriving from the correlation result or results, respectively, said watermark data information,
wherein said correlations in said correlation means are carried out in the frequency domain and wherein bins of the resulting spectrum or spectra for said section are set to zero which do not have an impact on forming a peak at location zero in said correlation result or results, and wherein said correlation means inversely transform the such processed spectrum or spectra into the time domain, wherein said correlation is performed using a one-dimensional real-symmetric fast Fourier transform in which, to said section representing a first transformed vector and having N values and to said pseudo-random sequence representing a second transformed vector having N values, N−1 zeroes are attached, and wherein one of said transformed vectors is multiplied by the conjugated version of the other transformed vector in order to form said correlation in the frequency domain, and wherein said inverse transform is an inverse one-dimensional real-symmetric fast Fourier transform.

9. The apparatus according to claim 8 wherein, in order to determine which ones of said bins do not have an impact on forming a peak at location zero in said correlation result, an indicator value for each bin is calculated and the values of said indicators are compared with a threshold value and the bin values being smaller than said threshold value are set to zero.

10. The apparatus according to claim 9, wherein said threshold value is selected such that essentially the smallest 15% of said bin values are set to zero.

11. The apparatus according to claim 8, wherein said section is processed with two different ones of said pseudo-random sequences in case said modulation is such that said correlation can result in a positive and a negative peak.

12. The apparatus according to claim 11, wherein said modulation is a CSK modulation.

13. The apparatus according to claim 8, wherein said modulation is a BPSK modulation.

14. The apparatus according to claim 8, wherein the value range for said resulting spectra is shifted from −1 . . . +1 to 0 . . . +1 or to 0 . . . −1.

* * * * *